(12) United States Patent
Liu et al.

(10) Patent No.: US 6,425,664 B1
(45) Date of Patent: Jul. 30, 2002

(54) FOLDING DEVICE OF GLASSES

(76) Inventors: Jung-Chuan Liu; Chih-Hsin Liu, both of No. 635, Chung-Cheng Rd., Chao-Tun Chen Nantou Hsien (TW)

(*) Notice: Subject to any disclaimer, the term of this patent is extended or adjusted under 35 U.S.C. 154(b) by 0 days.

(21) Appl. No.: 09/874,419

(22) Filed: Jun. 6, 2001

(51) Int. Cl.[7] .................................................. G02C 5/14
(52) U.S. Cl. ............................ 351/112; 351/111; 24/3.3
(58) Field of Search ............................... 381/112, 111, 381/41, 158; 24/3.3, 3.1

(56) References Cited

U.S. PATENT DOCUMENTS 4,050,785 A * 9/1997 Auge ......................... 351/111

* cited by examiner

Primary Examiner—Hung Xuan Dang
(74) Attorney, Agent, or Firm—Charles E. Baxley

(57) ABSTRACT

A folding device of glasses includes a body having two frames, and two temples that may be folded and expanded. Two magnetic attraction structures are mounted on the two temples, so that the two temples may magnetically attract each other when the glasses are disposed at a folded status. In such a manner, when the glasses are disposed at a folded status, and are hung on the pocket of a clothing, a first temple is placed in the pocket of the clothing, and a second temple is exposed outward from the pocket of the clothing, so that the two temples may attract and bond each other by the magnetic attraction structures to secure the glasses on the pocket of the clothing. Thus, the glasses can be rigidly and safely placed in the pocket, and can be removed from the pocket conveniently.

5 Claims, 3 Drawing Sheets

FOLDING DEVICE OF GLASSES

BACKGROUND OF THE INVENTION

1. Field of the Invention

The present invention relates to a folding device of glasses, and more particularly to a folding device of glasses, wherein the temples of the glasses are formed with magnetic attraction structures, whereby when the temples are folded, the glasses may be secured on the pocket of the user's clothes by the magnetic attraction structures, so that the glasses can be stored properly.

2. Description of the Related Art

The glasses may be expanded for use, and folded when not in use. However, when the glasses are not in use temporarily, the user will encounter the problem of how to receive or store the glasses. If the glasses are directly placed in the pocket of the clothes, the glasses easily detach from the pocket of the clothes. If the glasses are directly placed in the pocket of the pants, the glasses are easily compressed due to the large-scaled action of the user's body, thereby easily bending or wearing the glasses unintentionally. The glasses may be placed in the case, thereby achieving the purpose of safety. However, the case occupies a determined space, thereby causing inconvenience to the user when carrying the case. In addition, the user has to open the case for using the glasses, thereby causing inconvenience in use.

SUMMARY OF THE INVENTION

The present invention has arisen to mitigate and/or obviate the disadvantage of the conventional glasses.

Accordingly, the present invention is to provide foldable magnetic attraction structures on the body of the glasses, so that when the glasses are stored and placed in the pocket of the user's clothes, the glasses can be rigidly and stably attracted and clamped without free detachment, thereby satisfying the practice requirement of the glasses in use.

The primary objective of the present invention is to provide a folding device of glasses, comprising a body including two frames for receiving two lenses, and two temples each pivotally attached to one side of a respective frame, so that the two temples may be folded and expanded; wherein, two magnetic attraction structures are mounted on corresponding sides of the two temples, so that the two temples may magnetically attract each other when the glasses are disposed at a folded status; whereby, when the glasses are disposed at a folded status, and are hung on a clothing, a first temple is placed in the clothing, and a second temple is exposed outward from the clothing, so that the two temples may magnetically attract and bond each other by the magnetic attraction structures to secure the glasses on the clothing. Thus, the glasses can be rigidly and safely placed in the pocket, and can be removed from the pocket conveniently.

Further benefits and advantages of the present invention will become apparent after a careful reading of the detailed description with appropriate reference to the accompanying drawings.

DETAILED DESCRIPTION OF THE INVENTION

Figure 1:
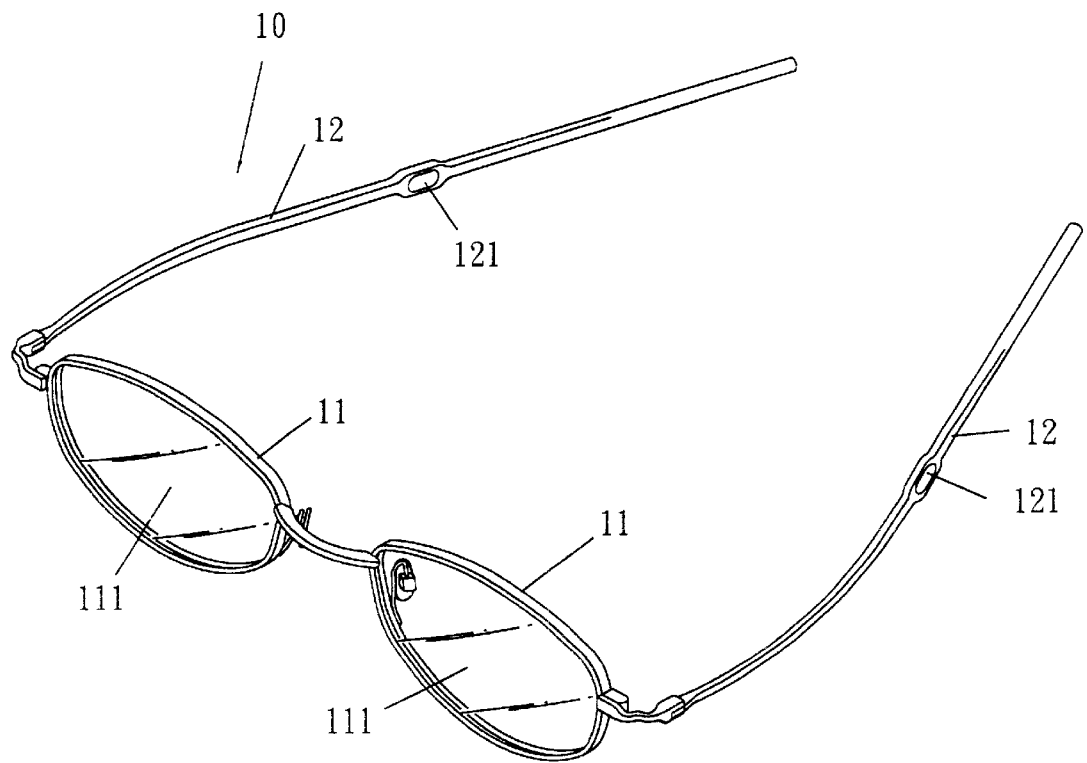
FIG. 1 is a perspective view of a folding device of glasses in accordance with the present invention.
Figure 2:
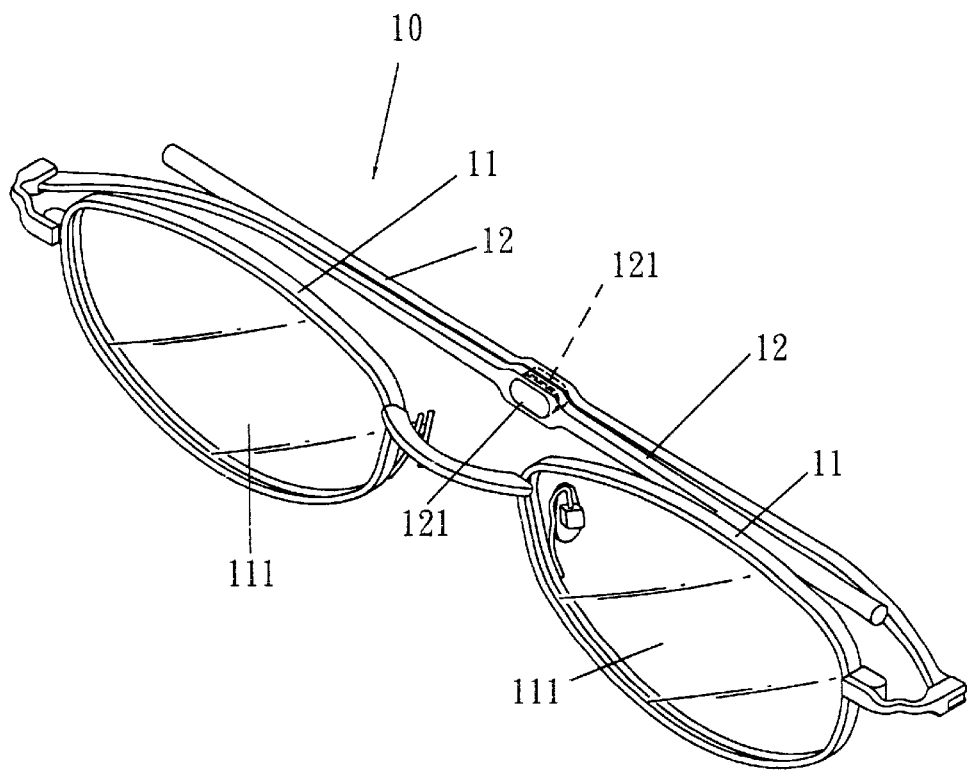
FIG. 2 is a folded view of the folding device of glasses as shown in FIG. 1.

Referring to the drawings and initially to FIGS. 1 and 2, a folding device of glasses in accordance with the present invention comprises a magnetic attraction structure 121 mounted on the body 10 of the glasses.

The body 10 includes two frames 11 for receiving two lenses 111, and two temples 12 each pivotally attached to one side of the respective frame 11, so that the two temples 12 may be folded and expanded. When the two temples 12 are expanded, the glasses may be mounted on the user's face by clip of the two temples 12. When the two temples 12 are folded, the glasses may have a shorter volume occupying a smaller space, thereby facilitating storing the glasses.

The folding device in accordance with the present invention mainly comprises two magnetic attraction structures 121 mounted on corresponding sides of the two temples 12, so that the two temples 12 may magnetically attract each other when the glasses are disposed at a folded status. The magnetic attraction structure 121 may be formed by mounting a magnetic stone on the temple 12, or by directly magnetizing the temple 12.

In addition, the magnetic attraction structure 121 of the present invention may be mounted on the mediate portion of the temple 12 as shown in FIG. 2, on the distal end of the temple 12 or on a proper position.

Figure 3:
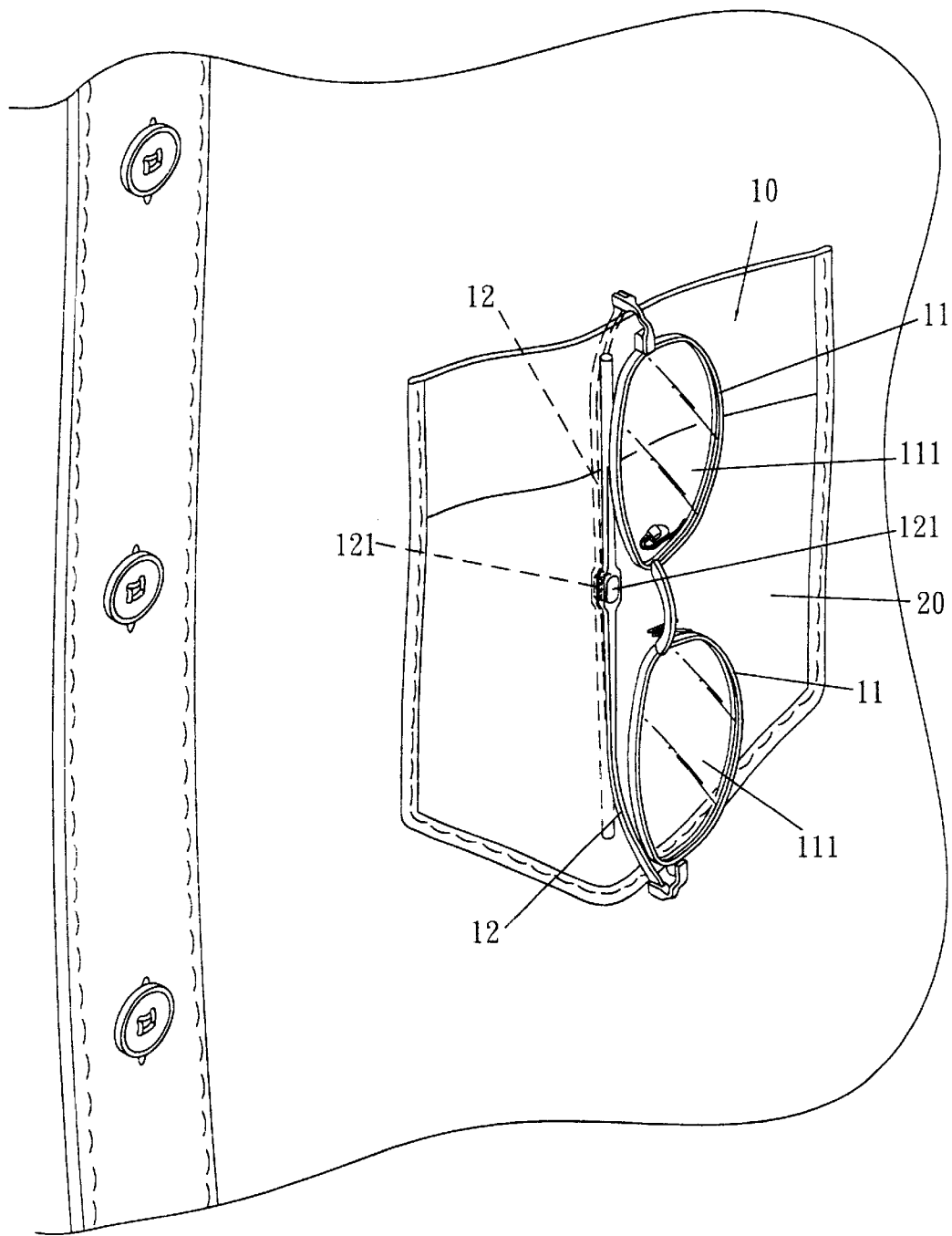
FIG. 3 is a schemiatic operational view of the folding device of glasses as shown in FIG. 1 in use.

Thus, in use of the present invention, when the glasses are not in use, the temples 12 of the glasses are folded to be hung on the pocket 20 of the user's clothes, with one temple 12 being placed in the pocket 20, and with the other temple 12 being exposed outward from the pocket 20, so that the two temples 12 may magnetically attract and couple each other by the magnetic attraction structures 121 to secure the glasses on the pocket 20 as shown in FIG. 3, so that the glasses can be rigidly and stably received in the pocket 20, and cannot be released from the pocket 20 freely.

The user may directly drive the outer temple 12 to move outward relative to the inner temple 12, so that the magnetic attraction structures 121 of the inner and outer temples 12 are separated from each other, thereby releasing the attraction bonding status of the inner and outer temples 12, such that the glasses may be directly removed from the pocket 20. Thus, the use of the glasses is very convenient.

It is appreciate that, the temple 12 may be made of stainless steel or of material having a magnetic attraction characteristic. In fact, the magnetic attraction structure 121 may be formed on a single temple 12. Thus, the magnetic conducting feature of the temple 12 may be directly used to attract the magnetic attraction structure 121 of the other temple 12. Alternatively, the two temples 12 may be directly formed into the magnetic attraction structure by the magnetization technology, so that the two temples 12 may attract and bond each other.

Accordingly, in accordance with the present invention, in operation, the corresponding sides of the two temples of the glasses are provided with the magnetic attraction structures, so that the two temples may magnetically attract and bond each other when the glasses are disposed at a folded status. Thus, when the glasses are not in use, the temples of the glasses are folded to be hung on the pocket of the user's clothes, with one inner temple being placed in the pocket, and with the other outer temple being exposed outward from the pocket, whereby the two temples may magnetically attract and bond each other by the magnetic attraction structures to secure the glasses on the pocket, so that the glasses can be rigidly and safely placed in the pocket, and can be removed from the pocket conveniently.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A folding device of glasses, comprising:

a body including two frames for receiving two lenses, and two temples each pivotally attached to one side of a respective frame, so that said two temples may be folded and expanded;

wherein, two magnetic attraction structures are mounted on corresponding sides of said two temples, so that said two temples may magnetically attract each other when said glasses are disposed at a folded status;

whereby, when said glasses are disposed at a folded status, and are hung on a clothing, a first temple is placed in said clothing, and a second temple is exposed outward from said clothing, so that said two temples may magnetically attract and bond each other by said magnetic attraction structures to secure said glasses on said clothing.

2. The folding device of glasses in accordance with claim 1, wherein said temple may be made of stainless steel or of material having a magnetic attraction characteristic, whereby said magnetic attraction structure may be formed on a single temple, such that a magnetic conducting feature of said temple may be directly used to attract said magnetic attraction structure of the other temple.

3. The folding device of glasses in accordance with claim 1, wherein said temple may be made of stainless steel or of material having a magnetic attraction characteristic, whereby said two temples may be directly formed into said magnetic attraction structure by a magnetization technology, so that said two temples may attract and bond each other.

4. The folding device of glasses in accordance with claim 1, wherein said magnetic attraction structure is correspondingly mounted on a mediate portion of said temple.

5. The folding device of glasses in accordance with claim 1, wherein said magnetic attraction structure is correspondingly mounted on a distal end of said temple.

* * * * *